Aug. 11, 1970  W. A. W. JORGENSEN  3,523,323
CONCEALED CABINET HINGE
Filed March 15, 1965  5 Sheets-Sheet 1
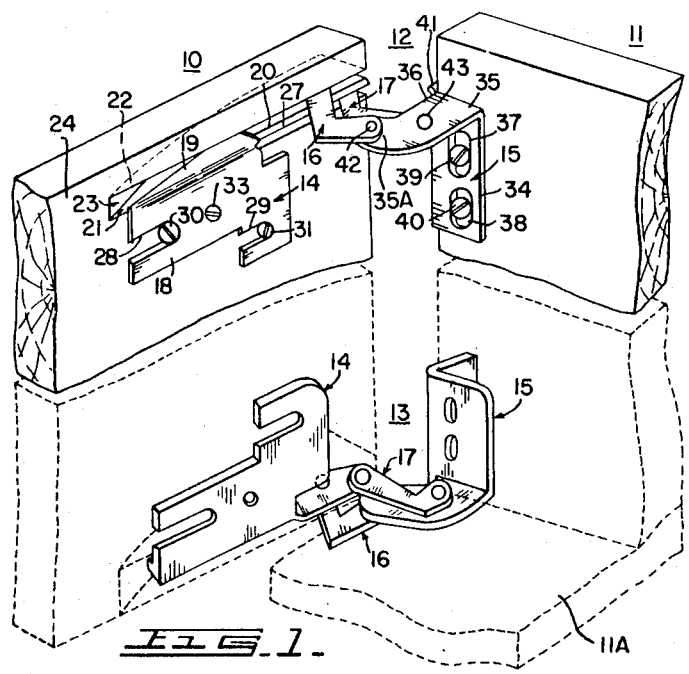
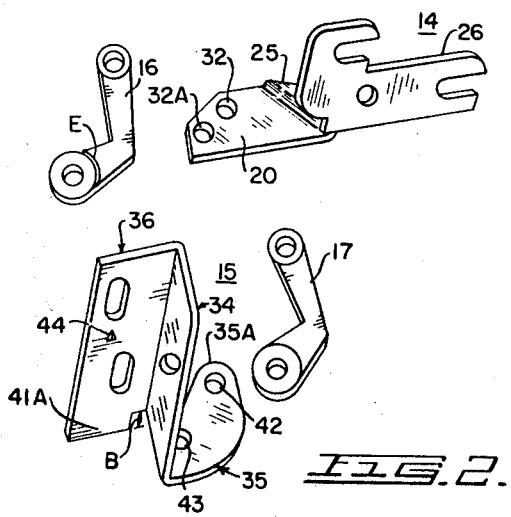
Inventor
William Alex Weyboll Jorgensen
By Cushman, Darby & Cushman
Attorneys

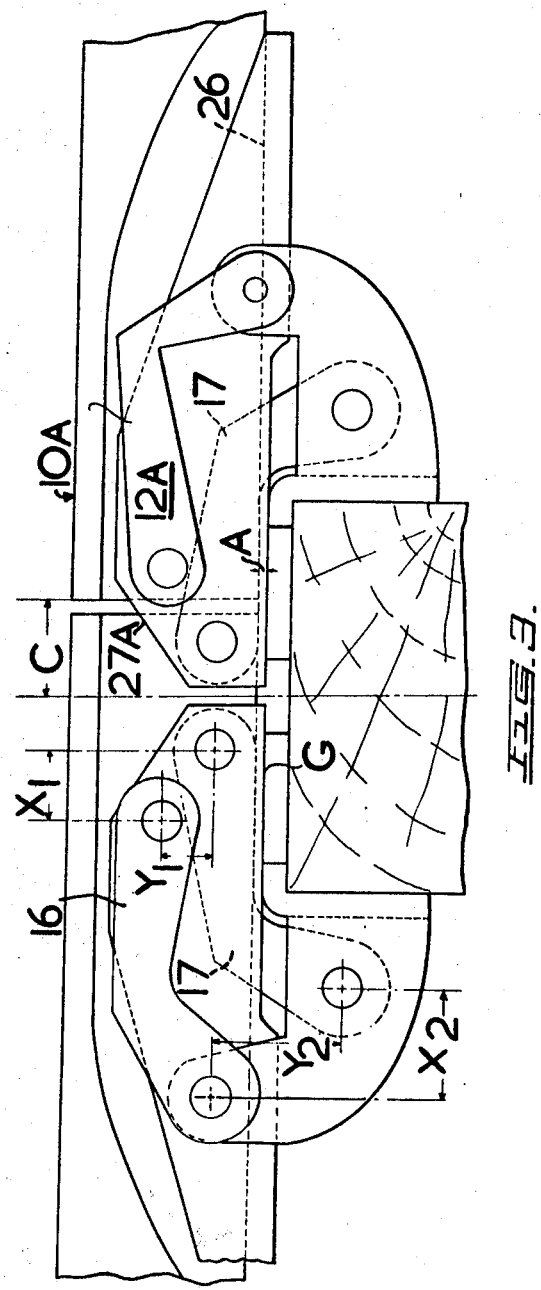

Aug. 11, 1970   W. A. W. JORGENSEN   3,523,323
CONCEALED CABINET HINGE
Filed March 15, 1965   5 Sheets-Sheet 4
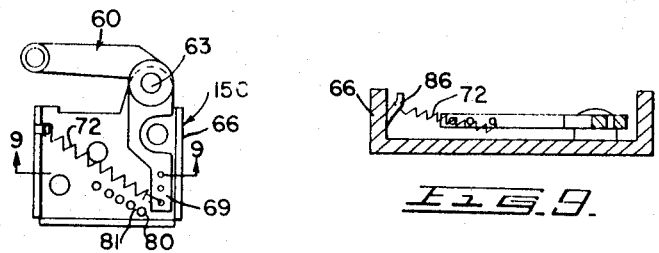
FIG. 8.   FIG. 9.
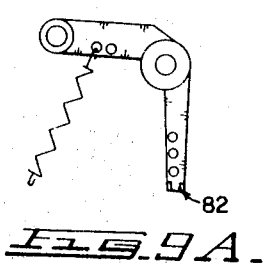   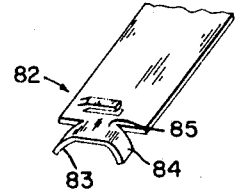
FIG. 9A.   FIG. 10.
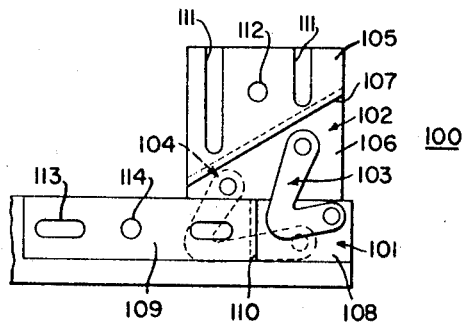
FIG. 11.
Inventor
William Alex Weyboll Jorgensen
By Cushman, Darby & Cushman
Attorneys Aug. 11, 1970   W. A. W. JORGENSEN   3,523,323
CONCEALED CABINET HINGE Filed March 15, 1965                    5 Sheets-Sheet 5

Inventor
William Alex Weyboll Jorgensen
By Cushman, Darby & Cushman
Attorneys

United States Patent Office 3,523,323
Patented Aug. 11, 1970

3,523,323
CONCEALED CABINET HINGE
William Alex Weyboll Jorgensen, 5360 Brookside, West Vancouver, British Columbia, Canada
Continuation-in-part of application Ser. No. 384,633, July 23, 1964. This application Mar. 15, 1965, Ser. No. 439,528
Int. Cl. E05d 3/06
U.S. Cl. 16—164       34 Claims

ABSTRACT OF THE DISCLOSURE

A hinge constructed in accordance with the present invention consists of a pair of plates interconnected by a pair of links said links being pivotally secured at opposed ends thereof to the respective plates with the pair of links at one end being disposed one on each side of a portion of the plate to permit overriding of the links during pivotal movement of the hinge, said pivots being disposed to define substantially a trapezoid in a position occupied when mounted and in a door closed position.

---

This is a continuation-in-part of application Ser. No. 384,633 filed on July 23, 1964, now abandoned.

This invention relates to concealed hinges and more particularly to the type of concealed hinge which includes a pair of plates interconnected by a pair of links pivotally secured to such plates at fixed points. The hinge is intended for securing doors to the structure of a cabinet; however, it will be obvious that the hinge will also have other applications.

In known concealed hinges, the amount of pivotal movement has been restricted within certain limits and, thus, limited in their application. The present hinge is of the type wherein the pair of links are mounted in such a manner that the links and pivot points may overpass and it is this feature which permits greater pivotal movement. One type of known concealed hinge is disclosed in U.S. Pat. No. 2,130,663 which was issued on Sept. 20, 1938. The hinge disclosed therein is typical of the type wherein the links are mounted in such a manner that they cannot override one another. A further type of hinge typical of the prior art is disclosed in U.S. Pat. No. 2,570,479, which was issued on Oct. 9, 1951, to one R. B. Pollman.

The present invention is related to the latter type of hinge. In the hinge disclosed in the above Pat. No. 2,570,479, it will be noted that the plates are secured to a wall and a door respectively with the face of such members substantially in alignment. In other words, the pivot points on the plate secured to the door are located laterally outwards of the door structure. It is not possible with that type of hinge to secure a door to a partition or frame of a cabinet structure wherein the plane of the door and the plane of the partition are disposed substantially normal to one another.

It is an object of the present invention to provide a concealed hinge of the latter type wherein the elements are formed of sheet metal and, thus, may be readily constructed by a simple stamping or similar press operation.

It is a further object of the present invention to provide a concealed hinge which may be pivoted through a relatively large arc for securing a door to a partition with the planes of the door and partition disposed substantially normal to one another in a door closed position.

It is a still further object of the present invention to provide a concealed hinge wherein all of the components of an installed hinge are disposed rearwardly of the front face of a door and inwardly of the edges thereof.

It is a still further object of the present invention to provide a hinge which is readily installed and adjustable at the points of fastening in such a way that it is possible to remove the door without removal of all of the fastening means and, thus, facilitate installation and adjustment.

In a further aspect of the invention, there is provided a hinge comprising a pair of relatively thin plate members substantially L shaped in cross section interconnected by links pivotally secured at opposed ends thereof to the respective plates at pivot points fixed with respect to the plate associated therewith, said links being disposed one on each side of a portion of each of the respective plate members and thereby permit overriding of the pivot and links during pivotal movement of the hinge.

In a still further aspect of the present invention, there is provided the combination of the cabinet structure and a hinge wherein the hinge pivotally secures the door to the cabinet, said hinge comprising a door plate detachably securable to the rear face of said door, a cabinet plate detachably securable to a portion of said cabinet structure, and a pair of links each pivotally secured at opposed ends respectively to said door and cabinet plates pivotally to interconnect said plates, all of the pivots of said links being disposed rearwardly of the front face of the door and at least three being within an area bounded by the perimeter thereof, said links being located one on each side of a portion of at least the door plate and thereby permit overpass of the link during relative movement of the plates.

The invention is illustrated by way of example in the accompanying drawings, where:

FIG. 1 is an oblique view, partially in phantom, illustrating a door secured to a cabinet wall by a pair of hinges constructed in accordance with the present invention;

FIG. 2 is an exploded view illustrating various components of hinge suitable for use in place of the upper hinge in FIG. 1 but includes various modifications;

FIG. 3 is a top plan view illustrating the mounting of a pair of doors to a common partition member by hinges constructed in accordance with the present invention;

FIG. 8 is a bottom view of the plate portion of the hinge illustrated in FIG. 7 securable to the rigid portion of a cabinet structure;

FIG. 9 is a cross section along section 9—9 of FIG. 8;

FIG. 9A is a top plan view of a modified link for use in a hinge of the present invention including means to lock the hinge in selected positions;

FIG. 10 is an exploded view of a portion of the link shown in FIG. 9A;

FIGS. 11, 12 and 13 are top plan views of various modified hinges constructed in accordance with the present invention;

Figures 4, 5:
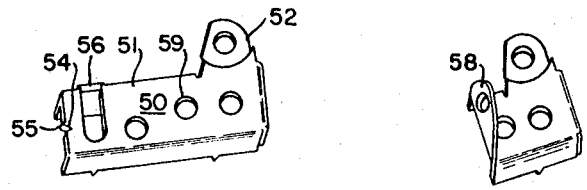
FIGS. 4 and 5 are oblique views of a modified plate for use in a hinge in accordance with the present invention, such plate being securable to the fixed portion of a cabinet structure.

Referring now in detail to the drawings, shown in FIG. 1 is a door 10 pivotally secured to a partition member 11 of a cabinet structure by an upper hinge 12 and a lower hinge 13. For the purposes of clarity, the door 10 and partition 11 are illustrated partially in section and partially in phantom.

Each of the hinges 12 and 13 consists of a pair of plates 14 and 15, which hereinafter will be referred to respectively also as door and cabinet plates. These plates are secured respectively to the door 10 and the partition 11 and are interconnected by a pair of links 16 and 17. Although the components of the upper and lower hinges are reversed from one another to provide what might be referred to as a left and right hand hinge, like numerals have been used for the similar parts for convenience of description.

The plate 14 consists of right angularly disposed leg portions 18 and 19, the leg portion 19 having an offset portion 20 formed integral therewith and the latter terminates in an edge 27 on the side adjacent the leg 18. The offset portion extends outwardly beyond the leg 18 and includes a pair of apertures 32 and 32A adjacent the free end to provide means of pivotally connecting one end of respective links 16 and 17 thereto. The amount of offset is approximately the thickness of a single link and is such that the links are properly spaced from opposed faces 21 and 22 of a groove 23 formed in the rear face 24 of the door. The offset portion and remaining portion of the leg have the junction thereof either right angularly disposed with respect to the plane of leg 18, as illustrated in the upper hinge 12, or alternatively at an angle thereto as illustrated in FIG. 2. The leg 19 also includes a face 25 which bears against the face 21 of the groove and, thus, properly positions the offset portion intermediate the faces 21 and 22 of the door groove 23.

The leg portion 18 includes an inner face 26 which abuts the rear face 24 of the door. This face 26 is offset in the direction toward the door with respect to the edge 27 of offset portion 20 such that the edge 27 abuts a portion of the plate 15 to prevent the door scraping or otherwise interfering with the partition 11 or plate 15 when the door is in a closed position. This spacing may be approximately 1/32 of an inch or some such other amount desired dependent upon the effect desired. This spacing is clearly illustrated in FIG. 3 designated as A.

The leg portion 18 includes a pair of screw receiving slots 28 and 29 offset from one another. These slots extend inwardly from a pair of offset parallel edges and receive screws 30 and 31. The slots terminating in offset portions and extending in the same direction provide means whereby the plate may be readily removed from the door by releasing the tension in the screws. If desired, an aperture may be provided intermediate the slots to receive a screw 33 rigidly to retain the plate in final position upon the door.

In the embodiment illustrated with respect to the upper hinge 12 the edge 27 is chamfered or sloped downwardly and outwardly and the purpose of this will be described more fully hereinafter.

The hinge plate 15 consists of first, second and third leg portions 34, 35 and 36 disposed substantially at right angles to one another. The leg 34 of hinge 12 is shown to include a pair of slots 37 and 38 for receiving respective screws 39 and 40 and such slots provide vertical adjustment of the hinge plate with respect to the partition. Preferably, to facilitate installation, these slotted apertures are located in leg 36 as alternatively illustrated in FIG. 2. The leg 36 of hinge 12 also includes apertures (not shown) for securing such leg to an edge of the partition 11 disposed normal to the face to which the leg 34 is secured. The leg 36 terminates at its upper edge in an outwardly turned lip 41 and when the door is in a closed position, this lip bears against the upper surface of the offset portion 20 of the door plate 14. The inclined edge 27 facilitates entry of this face below the outwardly turned lip and the abutting of adjacent surfaces provides a support for the door to relieve the stress from the hinge links when the door is closed.

In the embodiment illustrated with respect to the lower hinge 13, the lip 41 is designated 41A and is flattened out to extend outwardly beyond the adjacent edge of the leg portion 34 an amount sufficient to provide an abutment and, thus, properly position the hinge vertically with respect to a lower shelf 11A of the cabinet structure. This modified form is clearly illustrated in the hinge plate shown in FIG. 2. The lip 41A extends below the leg 35 an amount indicated by reference B (see FIG. 2). The leg portion 35 extends outwardly from the partition 11 and includes an outwardly projecting portion 35A extending forwardly of the partition in a direction towards the door. The leg portion 35 includes a pair of spaced apertures 42 and 43 for receiving pins to provide pivot points for securing one end of respective links 16 and 17 to the cabinet plate.

In FIG. 2 the slotted apertures located in the leg 36 rather than in the leg portion 34 and disposed therebetween is a projecting spike portion 44 which provides a marker for positioning the hinge during installation of a door.

Each of the links 16 and 17 includes offsets adjacent the end portions to provide a bearing area adjacent and circumscribing each of the pivots and, thus, remove the remaining portion of the links from engagement with the door and hinge plates. This offset is clearly illustrated in FIG. 2 designated as E and it will be obvious that alternatively, the links may be entirely flat and suitable washers used in place of the offset.

Adjacent ends of the links 16 and 17 at the opposed ends are located on opposite sides respectively of offset portion 20 and leg 35 of the respective plates 14 and 15. The offset of the link is in the direction toward the portion of the plate to which the respective ends of the links are secured.

Each of the links 16 and 17 are substantially L-shaped in cross section and are secured at opposed ends to the respective plates 14 and 15 by pins inserted in the apertures to provide fixed pivots. Positioning of the pivots is somewhat critical. In FIG. 3, the position of these pivots is clearly illustrated and in reference to the left-hand portion of the drawing, the relative spacings are indicated by dimensions $X_1$, $Y_1$, $X_2$ and $Y_2$. The positioning of the pivot points may be varied to provide the desired arcuate movement of the door and in the preferred form, the trailing edge of the door, i.e. the edge having the hinge secured thereto, moves outwardly from the cabinet structure in an arcuate path. In an actual sample constructed, it has been found that appropriate movement of the door with respect to the cabinet structure can be had wherein the following dimensions are used:

$X_1 = 7.0$ mm.      $X_2 = 9.7$ mm.
$Y_1 = 5.4$ mm.      $Y_2 = 13.0$ mm.

These spacings are for links having a center-to-center distance for the pivots on each link of 26.6 mm. It is quite obvious that the length of the links can be varied in addition to varying the position of the pivot points on the respective plates to vary the arcuate movement of the door during opening and closing. In FIG. 3, it will be noted that the pivot point of link 16 on the cabinet plate and the pivot of link 17 on the door plate are substantially in a line generally parallel to a plane defined by the rear face of the door and the pivots of the other ends of the respective links is located one on each side of such line. Also three of the pivots are located substantially between a pair of planes defined by the front and rear face of the door. This positioning of pivots provides extremely good results. Generally, it can be said the pivots are located in a trapezoid.

In order to install a hinge as described above, the inside face of the door 10 is grooved by a saw cut or slot 23 approximately 5/16 of an inch wide and 9/16 of an inch deep and of sufficient length to receive the leg portion 19 of the top plate. Positioning of the slot from the top and bottom of the door may be as desired, but preferably may be as close to the edge as possible. The hinge plate 14 is then secured to the door by the screws 30 and 31 with the face portion 25 bearing snugly against the face 21 of the slot. The door is then placed in the desired position against the frame with the hinge in a closed position and upon a gentle tap, the marking prong or spike 44 locates the position of the plate 15 with respect to the partition 11. The hinge is then removed from the door simply by loosening the screws 30 and 31 a partial turn and the plate 15 is secured to the partition 11.

It will now be evident that the modified form of plate 14 illustrated in FIG. 2 is somewhat superior to that of the upper hinge in FIG. 1 in that there is greater surface of the leg 19 in contact with the edge of the wall. Also, the offset portion 20 is substantially shorter in the FIG. 2 embodiment and thus more rigid and since this offset portion bears the entire weight of the assembly, it provides a stronger hinge.

In a described embodiment, it will be noted that the entire hinge is located substantially rearwardly of an area defined by the perimeter of the door and the pivot points for the links are located rearwardly of the front face of the door and within the area defined above. It is obvious that not any of the hinge structure is normally visible from the front of the cabinet when the door is closed and not only are the pivots located behind the door but also the major portion of the hinge plates are disposed within an area bounded by the perimeter of the door.

In FIG. 3, it will be noted that the door may be moved laterally with respect to the center line of the partition structure of the cabinet in which case a portion of hinge 12A projects beyond an edge of door 10A. In order to provide for this lateral adjustment, the hinge plate 14 includes a chamfered edge portion 27A. It will be noted in FIG. 3 that the edge of the doors is offset to the right of the center line of the partition by a mount C and, in practice, this may be up to approximately one-quarter of an inch. A similar adjustment in that amount may be made in the opposite direction and thus the cabinet structure need only be installed within a ½ inch tolerance. This type of adjustment is contrary to normal hinges, particularly those of the concealed type.

Figure 6:
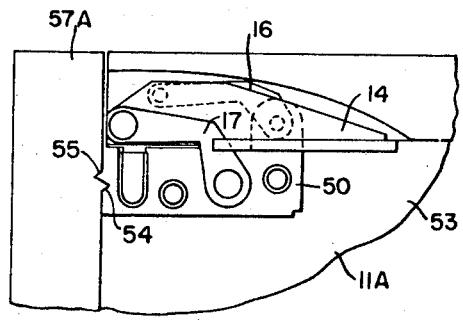
FIG. 6 is a top plan view of a hinge illustrating the mounting utilizing a plate of the type illustrated in FIG. 4.

Referring now to FIGS. 4 and 5, it will be noted that there is disclosed a modified cabinet plate. In FIG. 4, the plate 50 consists of a substantially U-shaped portion 51 having a portion 52 projecting therefrom. This hinge plate may be used with the door plate 14 and links 16 and 17 as illustrated in FIG. 1, and replaces the cabinet plate 15. A typical installation is illustrated in FIG. 6 wherein the modified cabinet plate 50 is supported upon the lower shelf 11A of the cabinet. In this installation, the cabinet partition 57A extends beyond the edge of the door, i.e. exposed frame type structure.

One end of the plate 50 includes a V notch 54 adjacent a projecting portion 55 and these portions are located in such a position intermediate the flanges of the plate that a pair of plates may be utilized in end-to-end abutting relation with the projecting portion 55 of one plate projecting into the notch 54 of the other. In FIG. 6, it will be seen that the projecting portion 55 fits into a recess in the inner face of the cabinet partition wall 57A in which case it facilitates retaining the plate in position and also provides means of marking for properly positioning the plate during installations.

In the embodiment illustrated in FIG. 5, the body portion 51 is substantially shorter and includes an upwardly turned flange portion 58 which is apertured and may be secured to the cabinet wall 57A by means of a screw or other suitable means. In each of the plates illustrated in FIGS. 4 and 5, there is an aperture in the projecting portion 52 and this aperture provides means for pivotally securing one end of the link 16 to the plate. There is a further aperture designated 59 in the plate body portion 51 and provides means for pivotally securing the link 17 to such plate.

The depth of the channel in each of the two embodiments may be varied depending upon the desired vertical spaced relation of the projecting portion 52 with respect to the cabinet shelf 11A.

Figure 7:
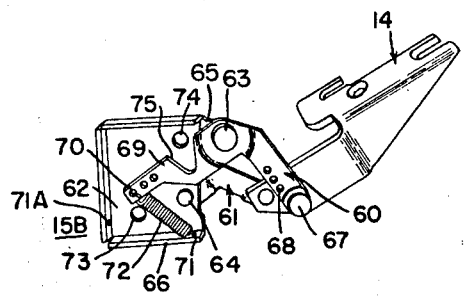
FIG. 7 is an oblique view of a modified hinge wherein a spring is used normally to bias the door optionally in an open or closed position.

A still further modified hinge assembly is illustrated in FIG. 7, consisting of a door plate 14 and a cabinet plate 15B, interconnected by a pair of links 60 and 61. The door plate 14 is the same as previously described. The modified hinge illustrated in FIG. 7 is spring loaded and may be self-closing or self-opening, depending upon the position of anchoring the spring with respect to one of the moving links.

The cabinet plate 15B consists of a stamped sheet metal member having a central planar portion 62, apertured to receive pins 63 and 64 to provide means for pivotally securing the respective links 60 and 61 to such plate. The aperture for pin 63 is disposed below the link 60 and in a portion 65 projecting outwardly from the central planar portion of the cabinet plate. The cabinet plate terminates at the remaining marginal edges in an outwardly turned flange 66.

The link 60 is pivotally secured at one of its ends to the door plate 14 by a pin 67 and the portion between such pivot and pivot pin 63 is apertured as at 68 to provide means of anchoring one end of a tension spring. The link 60 includes an extending arm portion 69 overlying the portion 62 of the cabinet plate 15B and this extending portion is likewise apertured as at 70 for the purpose of providing an anchoring means for one end of the tension spring. The apertures 68 and 70 obviously may be replaced by other mechanical equivalents as, for example, tabs formed integral with the link and struck outwardly therefrom.

The cabinet plate 15B includes apertures 71 and 71A in the flange 66 and these provide alternate positions for anchoring the other end of the tension spring to the cabinet plate. A tension spring 72 is illustrated in FIG. 7, secured at one end to the link 60 and at the other end to the plate 15B by hook portions engaging respectively, apertures 70 and 71. In this position the hinge is spring loaded to bias a door to a normally open position. Alternatively, the one end of the spring may have the hook portion engaging any one of the plurality of apertures 68 shown and the other end in aperture 71A and in such position the plates would bias the door to a normally closed position while the door is swung open from a closed position through an arc of 90° or less and biased open while the door continues to be swung open through an arc from 90° to 180°.

The portion 62 of the cabinet plate 15B includes a pair of apertures 73 and 74 for receiving screws whereby the plate may be secured to the cabinet. In order to provide a minimum sized cabinet plate, the link 60 includes a notched portion 75 so as to avoid abutment with a screw inserted through the aperture 74. This notch may be disposed of by increasing the size of the plate such as to position the screws out of the path of travel of the link extending portion 69. It will now be obvious that the flange 66 of the cabinet plate provides a space for protecting and receiving the tension spring 72 as well as the extending portion 69 of the link 60. The flange 66 may project from the portion 62 any desired amount, however it should be selected such that it provides means for appropriately spacing the hinge with respect to the shelf 11A or similar structure of the cabinet.

FIG. 8 illustrates a plate 15C and the link 60 in a position with respect to one another that they would occupy when the door is in a closed position. It can be seen that the tension spring is fully extended and the extending portion 69 of the link is in abutting relation with the flange 66. This provides a stop to limit the open position as will be seen hereinafter. The plate 15C in FIG. 8 includes a plurality of alternate recesses and projections 80 and 81 located generally in an arc about the pivot pin 63. These alternate recesses and projections cooperate with a slide 82 on the end or adjacent to the free end of the extending portion 69 of the link 60 to provide engagement therewith and form a ratchet to retain the hinge in various selected positions. The slide 82 may be a separate member secured to the link 60 or, alternatively, it may consist of a pair of downwardly turned portions 83 and 84 formed integrally with the link as illustrated in FIG. 10. The link 60 may be provided with downwardly turned light portions 83 and 84 joined to the link by a relatively narrow portion 85 such that they may be readily severed from the link by pair of pliers or the like in the event they are not desired.

FIG. 9 is a cross-section along section 9—9 of FIG. 8 and this figure illustrates an alternative means of securing the spring 72 to the cabinet plate by having a tab 86 struck outwardly from the flange 66.

In the hinges described in the foregoing, the plates are left and right handed depending upon the position they occupy and the plate 15B in FIG. 7 will be noted to be opposite to the plate 15C in FIG. 8.

A further modified form of the invention is illustrated in FIG. 11 wherein the hinge 100 consists of a door plate 101 and a cabinet plate 102 interconnected by a pair of links 103 and 104 pivotally secured at opposed ends to the respective plates. Each plate consists of a pair of portions disposed in substantially parallel planes one being offset an amount approximately equal to the thickness of a single link and the other an amount equal to the thickness of the plate. The plate 102 consists of portions 105 and 106 offset at 107 while plate 101 consists of portions 108 and 109 offset at 110. The cabinet plate 102 includes a pair of slotted notches 111 extending from one edge thereof inwardly and disposed therebetween is a further aperture 112. These apertures are for the purpose of securing the plate to the cabinet. The door plate 101 includes a pair of slotted apertures 113 and a further aperture 114 therebetween to receive screws for securing the plate to an edge of the door.

Figure 12:
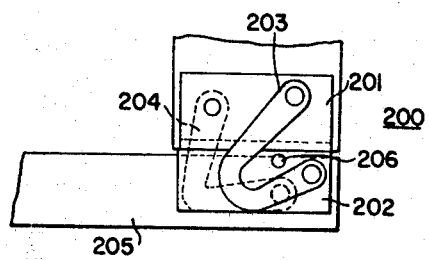

In FIG. 12 is shown a modified hinge 200 which could be used in an appliance such as, for example, a refrigerator or stove or the like and consists of a pair of L-shaped plates 201 and 202 interconnected by links 203 and 204. The plates as shown are secured in suitable recesses and when the door 205 is closed, no part of the hinge is shown either interiorly or exteriorly of the appliance. The hinge could, of course, be applied to other appliance installations and could also include a positive stop consisting of a pin 206 to limit the arcuate movement of the door. This stop will be mentioned later as it applies to all of the various embodiments in various forms.

Figure 13:
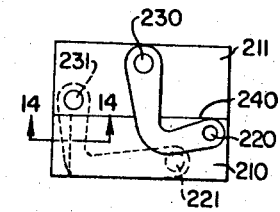

FIG. 13 is a plan view illustrating the basic design of the present hinge and consists of two links interconnecting a pair of plates with the links being secured to the plates so as to pivot about four fixed points. The links are located one on each side on the portion of the plates such that the links overpass each other as do the pivot points during pivoting of one plate with respect to the other. The plates, while pivoting simultaneously, move away from one another to vary their relative positions. The pivot interconnecting the links and the plates may consist of pins, bolts, balls or the like. The pivot points are not necessarily in the position as shown and by moving all of them, a vast number of performances of the device can be achieved. The location of the pivots in the instant embodiment differs from the previous forms in that the pivots on one plate are located to one side of a line separating the two plates and the pivots on the other plate are disposed on the other side of such line. That is, pair of pivots 220 and 221 and pair of pivots 230 and 231 are located respectively on opposed sides of a line 240 separating the two plates 210 and 211.

Figure 14:
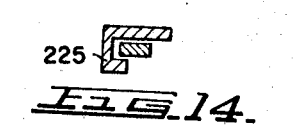
FIG. 14 is a cross section along section 14—14 of FIG. 13.

FIG. 14 is a section illustrating a support for one link which consists of an extension of the plate to provide a substantially U-shaped portion 225. The portion 225 includes a flange positioned to engage one of the links interconnecting the plates.

Figure 15:
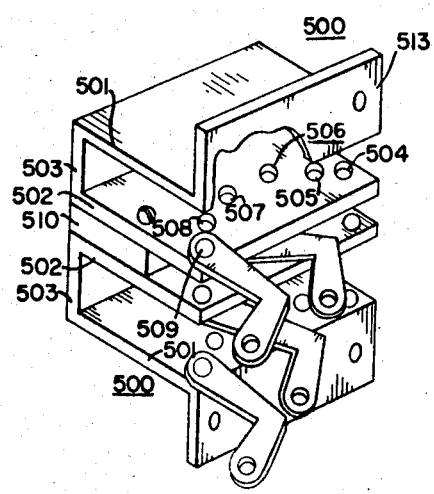
FIG. 15 is an oblique of a still further modified form of plate for use in a hinge of the type constructed in accordance with the present invention.
Figure 16:
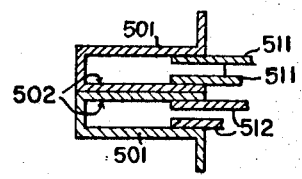
FIG. 16 is a vertical partial sectional view illustrating an alternative use of a hinge plate of the type shown in FIG. 15; and, FIG. 17 is a vertical sectional view of a still further modified hinge plate.

FIGS. 15 and 16 illustrate a modified hinge plate variously arranged for use with links as described in the previous embodiments and the plate as disclosed in these figures may be either used for the door plate or the cabinet plate, or both. Furthermore, the plate is constructed such that various combinations of them may be utilized to increase the strength for heavy installations. Shown in FIG. 15 is a pair of hinge plates 500 interconnected to provide a single unit. Each plate consists of a substantially U-shaped member having a pair of spaced parallel flanges 501 and 502, interconnected adjacent one edge by a web 503. The flanges 501 and 502 each include a plurality of apertures 504, 505, 507, 508 and 509, extending therethrough. Pairs of apertures 504 and 505 are in spaced relation with respect to one another, the same as the pair 508 and 509 but of opposite sense and this compares to the positioning of the pair of apertures in the offset portion 20 of the hinge plate 14 illustrated in FIG. 1. Similarly, the two apertures 504 and 506 are spaced in a selected position with respect to one another in a manner identical to the relation between apertures 507 and 509 but again of opposite sense and these compare to the apertures for securing the links to the plate 15 in the hinge illustrated in FIG. 1. In the event the plate 500 is used as a door plate, a pair of links will be pivotally secured thereto by pins projecting through either apertures 504 and 505 or 508 and 509, depending upon whether the hinge is left or right handed. In using a similar plate for the cabinet plate, the opposite ends of the links will be secured by pins projecting through apertures 504 and 506 or 507 and 509 of a similar plate and again depending as to whether or not it is a left or right hand plate.

The plates 500 are disposed in spaced relation with their adjacent flanges 502 being substantially parallel to one another. A bar member 510 is secured to the adjacent flanges 502 by bolts, welding or the like and retains the flanges in spaced relation. The spacing between the flanges and the compounding of the pair of plates provides a means whereby three links may be utilized for interconnecting the hinge plates. An alternative arrangement is illustrated in FIG. 16 where the flanges 502 of a pair of plates are in abutting relation and such plate may be connected to a similarly arranged pair of plates by either one or two pairs of links 511 and 512. In an alternative arrangement, now shown, a single plate 500 may be used as either a door plate or a hinge plate with a pair of links pivotally secured thereto. The links may be secured one at each side of a common flange, or alternatively, one link may be pivotally secured to one flange, for example flange 501, and the other link may be pivotally secured to the other flange 502.

In FIGS. 15 and 16, it will be noted that a plurality of links may be utilized to pivotally interconnect the hinge plates and with specific reference to FIG. 16, there is a pair of links 511 and 512 secured respectively to the flanges 501 of the upper and lower plate 500. A further pair of links 511 and 512 is pivotally secured to opposite faces of the abutting flanges 502.

Figure 17:
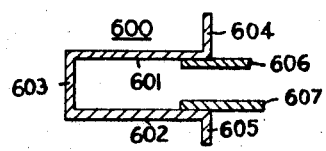

In FIG. 17 is illustrated a still further modified hinge plate 600 consisting of a generally U-shaped member having a pair of flanges 601 and 602 interconnected at one edge by a web 603. The opposite end of the flanges 601 and 602 terminate in respective outwardly directed flanges 604 and 605. These latter flanges may be suitably apertured for securing the plate to a cabinet or door structure, as the case may be. The plate 600 may be pivotally secured to a further similar plate by a pair of links 606 and 607. The link 606, as illustrated, is secured to the flange 601 while the link 607 is pivotally secured to the flange 602. Each of the flanges 601 and 602 includes sets of apertures as shown and described with reference to FIG. 15.

The various embodiments of the hinge described include positive stop means whereby a portion of one plate abuts a portion of the adjacent plate to limit the relative movement of the plates in one or both directions representative of opening and closing a door.

In FIG. 2, the tab 41A abuts an edge of the offset portion 20 of the door plate and thus limits the closed position. This abutment is clearly illustrated in FIG. 3 and designated therein as G. The plate 50 in FIG. 4 includes a tab 56 projecting from one wall of the portion 51 such as to abut an edge of the offset portion 20 of a door plate 14 and thereby limit the door closed position.

In the spring loaded hinge shown in FIG. 7, the extending portion 69 of the link 60 abuts the flange 66 and thereby limits both the open and closed position of the door.

I claim:
1. A hinge comprising
   (a) a first plate provided with
      (i) a fastening portion, and
      (ii) a fulcrum portion projecting laterally from said fastening portion and having a pair of opposed generally flat planar surfaces with two apertures extending therethrough, said apertures being disposed in selected lateral and longitudinal spaced relation and having their axis normal to the plane of said opposed faces, said fulcrum portion being offset from said fastening portion in a direction parallel to said axis;
   (b) a second plate provided with
      (i) a body portion having a fastening portion, and
      (ii) a fulcrum portion projecting outwardly from said body portion, said fulcrum portion having a pair of opposed generally flat faces disposed substantially parallel and in respective ones of the opposed planar faces of the fulcrum portion of the first plate, said fulcrum portion having two apertures extending therethrough in selected lateral and longitudinal spaced relation with their axis substantially normal to the flat planar faces; and
   (c) two links only, connected only to the said first and second plates by pins in respective ones of the apertures in the fulcrum portions, one said link extending from a selected face of the fulcrum portion of said first plate to a corresponding selected face of the fulcrum portion of said second plate and said other link extending from the opposite face of the fulcrum portion of the first plate to a corresponding face of the fulcrum portion of said second plate.

2. A hinge as defined in claim 1, where, in one position of the hinge, a portion of the fulcrum portion of said second plate is disposed in overlapping relationship with respect to the body portion of the first plate in stacked relation in a direction parallel to the axis of the apertures.

3. A hinge as defined in claim 1 including at least one elongated slot in the fastening portion of one of said first and second plates.

4. A hinge as defined in claim 1, including at least one elongated slot in the fastening portion of each of said first and second plates, the longitudinal axis of the elongated slots in one plate being disposed at right angles to the longitudinal axis of the slots in the other plate.

5. A hinge as defined in claim 1, including a tension spring anchored at one end to one plate and at the other end to one link and thereby biasing the pair of plates to a selected position relative to one another.

6. A hinge as defined in claim 1, including a plurality of alternate projections and recesses in an otherwise substantially flat portion of one plate and a rib on one of said links, said rib being engageable with the projections and thereby providing a ratchet to retain the plates in various selected relative positions.

7. A hinge as defined in claim 1, including a tension spring anchored at one end to one plate and at the other end to one of said links, said hinge further including a plurality of alternate projections and recesses in an otherwise substantially flat portion of one plate and a rib on one of said links, said rib being engageable with the projections and thereby providing a ratchet to retain the plates in various selected relative positions.

8. A cabinet hinge as defined in claim 1 wherein said cabinet plate consists of a member having a portion securable to the cabinet and a further portion projecting outwardly therefrom in a direction toward said door, the latter projecting portion having at least one of the links pivotally secured thereto such that the pivot is located in a plane generally forward of the cabinet structure adjacent the door.

9. A concealed hinge as defined in claim 1 wherein each of said links are generally flat bars substantially L-shaped in plan view.

10. A hinge as defined in claim 1 including stop means to limit arcuate movement of said hinge.

11. A hinge as defined in claim 1 wherein one of said plates includes a portion projecting therefrom and overlapping a portion of the other plate to provide a support when the door is closed, thereby relieving the links of any vertical load.

12. A hinge as defined in claim 1 wherein at least one of said plates has slotted apertures terminating in a marginal edge of said plate.

13. A hinge as defined in claim 1 wherein said second plate consists of a substantially U-shaped in cross section channel member having a pair of flanges extending outwardly from a central web portion, said web having a portion projecting laterally beyond one of the flanges and apertured to provide means of pivotally securing one of said links thereto, said plate including an aperture located in the web for pivotally securing the other link thereto.

14. A hinge as defined in claim 1 wherein said cabinet plate consists of a channel member substantially U-shaped in cross section having a pair of flanges extending from a common web, said web including a portion projecting laterally beyond one of the flanges and apertured to provide means of pivotally connecting one of the links thereto and the web being apertured to provide means to pivotally secure the other link thereto, said web having a further portion adjacent one end disposed normal to the web providing means of securing the plate to a wall of the cabinet when the flanges bear upon a shelf.

15. A hinge as defined in claim 2, wherein said overlapping portions are so arranged that when said hinge is used to mount a door, the overlap of said portions is intermediate the front and rear face of the door.

16. A concealed hinge comprising in combination a pair of relatively thin L-shaped in cross section plates securable respectively to a first and second structure, one leg of said plates being secured to respective ones of the first and second structures and the other leg of said plates being disposed in a common plane, and a pair of links each pivotally secured only to said other leg of respective ones of said plates, the pivots on each link and each leg portion of the plates to which they are secured being disposed in selected lateral and longitudinal spaced relationship with said links located one on each of said further leg portions to permit overriding of the links during relative movement of said plates.

17. A hinge structure as defined in claim 16 wherein no portion of the plate projects from a face of the door opposite to the face to which such plate is secured.

18. A hinge as defined in claim 5, wherein said spring is anchored to said link at a position intermediate the pivotal attachment of said link to the respective plates.

19. A hinge for use in pivotally mounting a door to a cabinet structure comprising in combination a pair of first and second hinge plates adapted to be secured respectively to said door and said cabinet and a pair of connecting links, consisting of flat bars, pivotally connected at their opposite ends to the respective plates, said first and second plates each being substantially L-shaped in cross section having a first and second leg substantially at right angles to one another, the first leg of said first plate being securable to said door and said second leg normal to a face thereof and adapted to project into a recess therein, the first leg of said second plate being securable to said cabinet structure and said second leg projecting outwardly therefrom, said legs being substantially flat planar members disposed in a common plane and said links being pivotally connected adjacent opposed ends to the second legs of the respective plates, said links being located one on each side of said second legs thereby permitting overriding of the links during oscillation thereof about their respective pivots.

20. A hinge as defined in claim 6, wherein said rib consists of a pair of prongs formed integral with a portion extending outwardly from the link and joined thereto by a weakened section which may be readily severed from the remainder of the link.

21. A concealed hinge for pivotally securing a door to a cabinet structure comprising:
 (a) a door plate substantially L-shaped in cross section having a pair of legs disposed at right angles to one another with one leg securable to the rear face of said door and the other leg projecting therefrom into a recess in the door extending generally in the direction towards the front face, said inwardly projecting portion being offset adjacent the free end from the remainder of such leg portion;
 (b) a cabinet plate detachably securable to a wall of said cabinet structure with the plane thereof disposed substantially normal to the plane of the door when the latter is in a closed position, said cabinet plate having a portion projecting outwardly from said wall and disposed in a plane common to the offset portion of the door plate; and
 (c) a pair of links each pivotally secured adjacent opposed ends respectively to the offset portion of the door plate and the projecting portion of the cabinet plate with the links located one on each side of their respective plate portions to provide overriding of the links and pivots during relative movement of one plate with respect to the other.

22. A concealed hinge as defined in claim 21 wherein the leg portion of the door plate adapted to abut the rear face of said door includes a pair of elongated notches terminating in one edge thereof to provide means of readily removing said plate from the door.

23. A concealed hinge as defined in claim 21 wherein the leg portion of said door plate adapted to project into a groove in the door with one portion of such leg bearing against a wall of the groove and thereby position the offset portion intermediate the walls of such groove.

24. A concealed hinge for use in pivotally securing a substantially planar door having a front and rear face to a wall of a cabinet structure disposed substantially normal to the door faces when said door is in a closed position, comprising:
 (a) a door plate substantially L-shaped in cross section having a first leg thereof detachably securable to the rear face of the door and a second leg projecting into a groove in the door in a direction toward the front face thereof, said second leg having a first planar portion abutting a wall of the groove and a second planar portion laterally offset to be disposed substantially parallel to the first planar portion intermediate the walls of said groove, said portions being integrally formed with the offset disposed angularly with respect to the plane of the first leg, said offset portion terminating in a chamfered corner at the free end adjacent the edge remote from the second leg, said second leg abutting the rear face of the door and having a pair of elongated slots extending from a pair of spaced parallel edges stepped inwardly to provide means of receiving screws for securing the plate to said door;
 (b) a cabinet plate detachably securable to the wall of said cabinet and being substantially L-shaped in cross section having a first leg securable to the face of the wall normal to the door faces when closed and having a second leg projecting outwardly therefrom; and
 (c) a pair of links each pivotally secured at opposed ends respectively to said door and cabinet plates at predetermined fixed positions, the links being secured to the offset portion of the door plate intermediate the front and rear face of said door and the pivots of the opposed ends of said links being secured to the second leg of said cabinet plate, each of said links being substantially L-shaped in plan view and having a portion circumscribing each of the pivots laterally offset in the direction of the axis of the pivot to provide a bearing abutting the associated portions of the hinge plates.

25. A hinge comprising:
 (a) a first plate including a first and a second leg portion disposed normal to one another and having:
  (i) a plurality of notches directly inwardly from one edge therein in said first leg; and
  (ii) a portion projecting from an opposite edge on said second leg and offset with respect to the remaining portion thereof;
 (b) a second plate having first, second and third leg portions disposed normal to one another, said first and second portions being securable to a cabinet partition wall adjacent a marginal edge thereof with the third leg projecting from said cabinet and disposed in the same plane as the offset portion of said first plate, and
 (c) a pair of flat bar links, substantially L-shaped in plan view, pivotally connected respectively to the second and third legs of said first and second plates and located one on each side thereof.

26. A hinge as defined in claim 25 wherein the second leg of said second plate terminates in an outwardly projecting portion over-lapping, in one selected relative position of the plates, the offset portion of the second leg of the first member to provide without substantially any bending stress on the links means of transferring a load from one plate to the other in a folded or closed position.

27. A cabinet structure having a front vertical face and including at least one support adjacent said face and a door pivotally secured thereto by a pair of vertically spaced hinges, said door being movable from a closed position where the door is substantially coplanar with said front face to an open position where the door is at a substantial angle thereto, each of said hinges comprising a first plate including a first and second leg portion disposed normal to one another and having a plurality of notches directly inwardly from one edge of said first leg, and an offset portion projecting from an opposite edge of said second leg, a second plate having first, second and third substantially planar leg portions disposed normal to one another with the first and second leg portions secured to said support and having the third leg projecting from said cabinet in a plane common to the plane of the offset portion of the first member, and a pair of bar link members substantially L-shaped in plan view pivotally connected at opposed ends thereof respectively to the second and third legs of said first and second plates, said pivots being disposed such that the plates are adapted to pivot with respect to one another and simultaneously be relatively movable to alter their relative positions, said first plate having the first leg thereof secured to said door and having the second leg projecting into a recess therein.

28. A cabinet structure as defined in claim 27 wherein said support is a vertical partition disposed normal to said front face, said second plate having the first and second leg portions secured respectively to a face and an edge of said partition and having the third leg portion projecting therefrom.

29. A hinge as defined in claim 28, wherein said stop comprises a portion on one plate engageable with a portion on the other plate.

30. A hinge as defined in claim 29, wherein said stop comprises a surface portion of the fastening portion of said second plate and an edge portion of the fulcrum portion of said first plate.

31. A hinge as defined in claim 29, wherein said stop comprises a portion of one of said first or second plates and one of said links, said portion of the plates being engageable with said link in a selected relative position of said plates.

32. A hinge as defined in claim 30, wherein the surface portion of the fastening portion of the second plate comprises a tab projecting beyond the first plate in a direction along the pivot axis of the links.

33. A hinge as defined in claim 21, wherein said links and plates are disposed such that at least three of the pivots are located at a position between the respective planes of the front and rear face of the door.

34. A hinge as defined in claim 13, wherein the web of said plate has V-shaped notch and lug in one end thereof disposed intermediate said flanges whereby a pair of such plates may be placed end-to-end with the lug of one plate projecting into the notch of the other plate to retain such pair of plates in alignment.

References Cited
UNITED STATES PATENTS

| | | | |
|---|---|---|---|
| 3,251,088 | 5/1966 | Boundy | 16—130 |
| 2,885,722 | 5/1959 | Halliday | 16—130 |

BOBBY R. GAY, Primary Examiner

D. L. TROOTMAN, Assistant Examiner